US012050746B2

(12) United States Patent
Fujimaki et al.

(10) Patent No.: US 12,050,746 B2
(45) Date of Patent: Jul. 30, 2024

(54) INK AMOUNT CALCULATION METHOD, INFORMATION PROCESSING DEVICE, AND PROGRAM

(71) Applicant: Wacom Co., Ltd., Saitama (JP)

(72) Inventors: Hideki Fujimaki, Saitama (JP); Tsukasa Nomi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/160,906

(22) Filed: Jan. 27, 2023

(65) Prior Publication Data

US 2023/0168765 A1 Jun. 1, 2023

Related U.S. Application Data

(63) Continuation of application No. PCT/JP2021/028327, filed on Jul. 30, 2021.

(30) Foreign Application Priority Data

Aug. 13, 2020 (JP) .................................. 2020-136864

(51) Int. Cl.
*G06F 3/041* (2006.01)
*G06F 3/0354* (2013.01)
*G06F 3/038* (2013.01)
*G06F 3/04883* (2022.01)
*G06Q 30/0226* (2023.01)
*G06F 3/044* (2006.01)

(52) U.S. Cl.
CPC ...... *G06F 3/04162* (2019.05); *G06F 3/03545* (2013.01); *G06F 3/0383* (2013.01); *G06F 3/04883* (2013.01); *G06Q 30/0226* (2013.01); *G06F 3/0441* (2019.05); *G06F 3/0442* (2019.05)

(58) Field of Classification Search
CPC ............. G06F 3/04162; G06F 3/03545; G06F 3/0383; G06F 3/04883; G06F 3/0441; G06F 3/0442; G06F 2203/0384; G06F 3/041; G06Q 30/0226
See application file for complete search history.

(56) References Cited

U.S. PATENT DOCUMENTS 10,789,035 B2* 9/2020 Tsubone ............. H04N 1/32144
2006/0093219 A1* 5/2006 Gounares ........... G06V 30/1423
382/187

(Continued)

FOREIGN PATENT DOCUMENTS

JP H10-293803 A 11/1998
JP 2003-330605 A 11/2003

(Continued)

OTHER PUBLICATIONS

International Search Report, mailed Sep. 7, 2021, for International Application No. PCT/JP2021/028327, 4 pages.

*Primary Examiner* — Ibrahim A Khan
(74) *Attorney, Agent, or Firm* — Seed IP Law Group LLP

(57) ABSTRACT

Provided is an ink amount calculation method performed by a processor of a computer. The method includes acquiring coordinate information related to stroke data generated according to an operation of an electronic pen, and calculating, based on the coordinate information, an ink amount related to an amount of the operation of the electronic pen.

20 Claims, 11 Drawing Sheets

(56) References Cited

U.S. PATENT DOCUMENTS

| | | | |
|---|---|---|---|
| 2009/0251440 A1* | 10/2009 | Edgecomb | G11B 27/34 715/863 |
| 2009/0253107 A1* | 10/2009 | Marggraff | G09B 11/00 434/165 |
| 2012/0254773 A1* | 10/2012 | Viswanathan | G06F 3/04883 715/753 |
| 2014/0118314 A1* | 5/2014 | Black | G06F 3/04842 345/179 |
| 2014/0118315 A1* | 5/2014 | Black | G06F 3/0321 345/179 |
| 2014/0253469 A1* | 9/2014 | Hicks | G06F 3/03545 345/173 |
| 2015/0235391 A1* | 8/2015 | Makino | G06F 3/03545 345/629 |
| 2015/0277583 A1* | 10/2015 | Kasahara | G06F 3/0383 345/179 |
| 2015/0371417 A1* | 12/2015 | Angelov | G06V 30/347 345/442 |
| 2016/0034752 A1* | 2/2016 | Tung | G06F 3/04883 382/189 |
| 2016/0092021 A1* | 3/2016 | Tu | G06F 3/04883 345/173 |
| 2016/0154997 A1* | 6/2016 | Kim | G06F 3/04883 382/189 |
| 2016/0231833 A1* | 8/2016 | Gu | G06F 3/03545 |
| 2016/0253300 A1* | 9/2016 | Tu | G06T 11/20 345/619 |
| 2016/0313814 A1* | 10/2016 | Jacobs | G06F 3/039 |
| 2017/0052696 A1* | 2/2017 | Oviatt | G06F 3/04883 |
| 2017/0060406 A1* | 3/2017 | Rucine | G06V 30/1423 |
| 2017/0147277 A1* | 5/2017 | Carney | G06F 3/1454 |
| 2017/0153806 A1 | 6/2017 | Rucine et al. | |
| 2017/0285930 A1* | 10/2017 | Sykes | H04N 21/458 |
| 2017/0330479 A1* | 11/2017 | Bowman | G09B 7/04 |
| 2018/0046268 A1* | 2/2018 | Keidar | G06F 3/04162 |
| 2018/0181296 A1* | 6/2018 | Lee | G06Q 50/20 |
| 2019/0347953 A1* | 11/2019 | Won | G06V 30/00 |
| 2019/0369755 A1* | 12/2019 | Roper | G06F 3/0481 |
| 2019/0385479 A1* | 12/2019 | Carney | G06F 3/0488 |
| 2020/0019306 A1 | 1/2020 | Angelov et al. | |
| 2020/0052520 A1* | 2/2020 | Kang | G06F 1/266 |
| 2020/0201533 A1* | 6/2020 | Schreiber | G06F 40/174 |
| 2020/0258417 A1* | 8/2020 | Mallin | G06F 3/16 |
| 2021/0019925 A1* | 1/2021 | Garcia Salvadores | G06T 3/02 |
| 2021/0132709 A1* | 5/2021 | Tatani | B43K 29/08 |
| 2021/0224528 A1* | 7/2021 | Mannby | G06V 30/387 |

FOREIGN PATENT DOCUMENTS

| | | |
|---|---|---|
| JP | 2019-507915 A | 3/2019 |
| JP | 2020-102275 A | 7/2020 |

\* cited by examiner

FIG.4

| USER ID | INK DATA |
|---|---|
| 123456789 | INK DATA 1 |
|  | INK DATA 2 |
|  | INK DATA 3 |
|  | ⋮ |
| ⋮ | ⋮ |

| TIMESTAMP | | | |
|---|---|---|---|
| SCAN RATE DATA | | | |
| FIRST COORDINATES | SECOND COORDINATES | PEN PRESSURE INFORMATION | SWITCH INFORMATION |
| FIRST COORDINATES | SECOND COORDINATES | PEN PRESSURE INFORMATION | SWITCH INFORMATION |
| FIRST COORDINATES | SECOND COORDINATES | PEN PRESSURE INFORMATION | SWITCH INFORMATION |
| ⋮ | ⋮ | ⋮ | ⋮ |

<u>STROKE DATA</u>

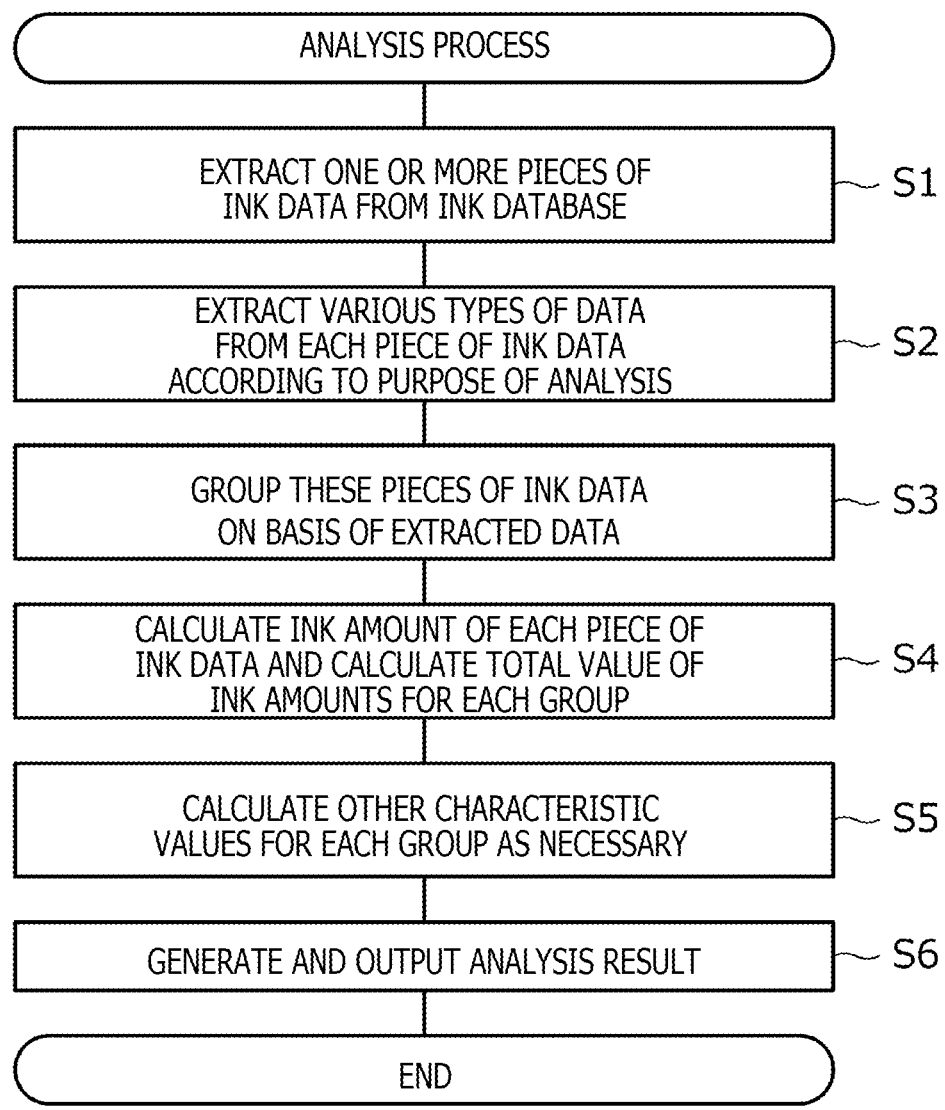

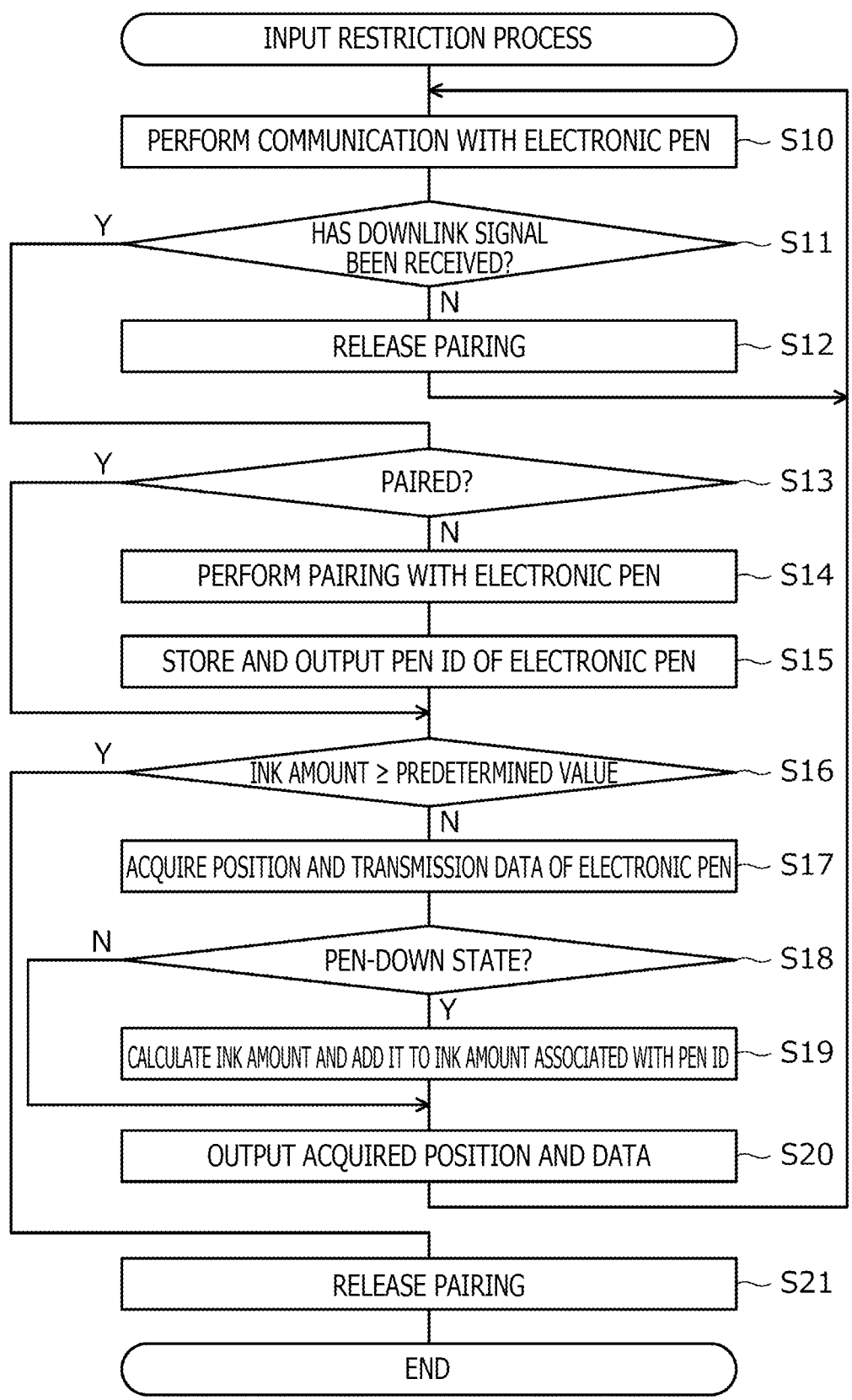

INK AMOUNT CALCULATION METHOD, INFORMATION PROCESSING DEVICE, AND PROGRAM

BACKGROUND

Technical Field

The present disclosure relates to an ink amount calculation method, an information processing device, and a program.

Description of the Related Art

There is known a computer that receives a handwriting input with an electronic pen and that outputs the result as ink data. Japanese Patent Laid-Open No. 2019-507915 discloses an example of this type of computer.

In recent years, a handwriting input with an electronic pen has been utilized in an increasing number of situations. For example, the introduction of electronic pens is expanding in educational settings such as schools. Under such circumstances, it is desired to utilize an electronic pen for the purpose of improving motivation for study or work, for example.

BRIEF SUMMARY

Therefore, it is desirable to provide an ink amount calculation method, an information processing device, and a program that can visualize the volume of study or work.

An ink amount calculation method according to a first aspect of the present disclosure is performed by a processor of a computer and includes acquiring coordinate information related to stroke data generated according to an operation of an electronic pen, and calculating, based on the coordinate information, an ink amount related to an amount of the operation of the electronic pen.

An ink amount calculation method according to a second aspect of the present disclosure is performed by a processor of a computer and includes extracting coordinate information related to a trajectory of an electronic pen from ink data including information related to the trajectory of the electronic pen, and calculating, based on the coordinate information, an ink amount indicating an amount of an operation of the electronic pen.

An information processing device according to the first aspect of the present disclosure includes a processor, and a memory storing instructions that, when executed by the processor, cause the processor to acquire coordinate information related to stroke data generated according to an operation of an electronic pen, and calculate, based on the coordinate information, an ink amount related to an amount of the operation of the electronic pen.

An information processing device according to the second aspect of the present disclosure includes a processor, and a memory storing instructions that, when executed by the processor, cause the processor to extract coordinate information related to a trajectory of an electronic pen from ink data including information related to the trajectory of the electronic pen, and calculate, based on the coordinate information, an ink amount indicating an amount of an operation of the electronic pen.

A program according to the first aspect of the present disclosure is a program for a computer, including, by a processor of the computer, extracting coordinate information related to stroke data generated according to an operation of an electronic pen, and calculating, based on the coordinate information, an ink amount related to an amount of the operation of the electronic pen.

A non-transitory computer readable storage medium according to the second aspect of the present disclosure stores instructions that, when executed by a processor cause the processor to extract coordinate information related to a trajectory of an electronic pen from ink data including information related to the trajectory of the electronic pen, and calculate, based on the coordinate information, an ink amount indicating an amount of an operation of the electronic pen.

According to an embodiment of the present disclosure, the volume of study or work can be visualized.

BRIEF DESCRIPTION OF THE SEVERAL VIEWS OF THE DRAWINGS

FIG. 4 is a diagram illustrating data stored in an ink database illustrated in FIG. 1;

FIG. 6 is a diagram illustrating data structure of stroke data illustrated in FIG. 5;

FIG. 8 is a flowchart illustrating a processing flow of an analysis process performed by the server device illustrated in FIG. 1;

FIG. 11 is a flowchart illustrating an example of a processing flow of an input restriction process performed by the user device illustrated in FIG. 1.

DETAILED DESCRIPTION

Hereinafter, an embodiment of the present disclosure is described in detail with reference to the accompanying drawings.

Figure 1:
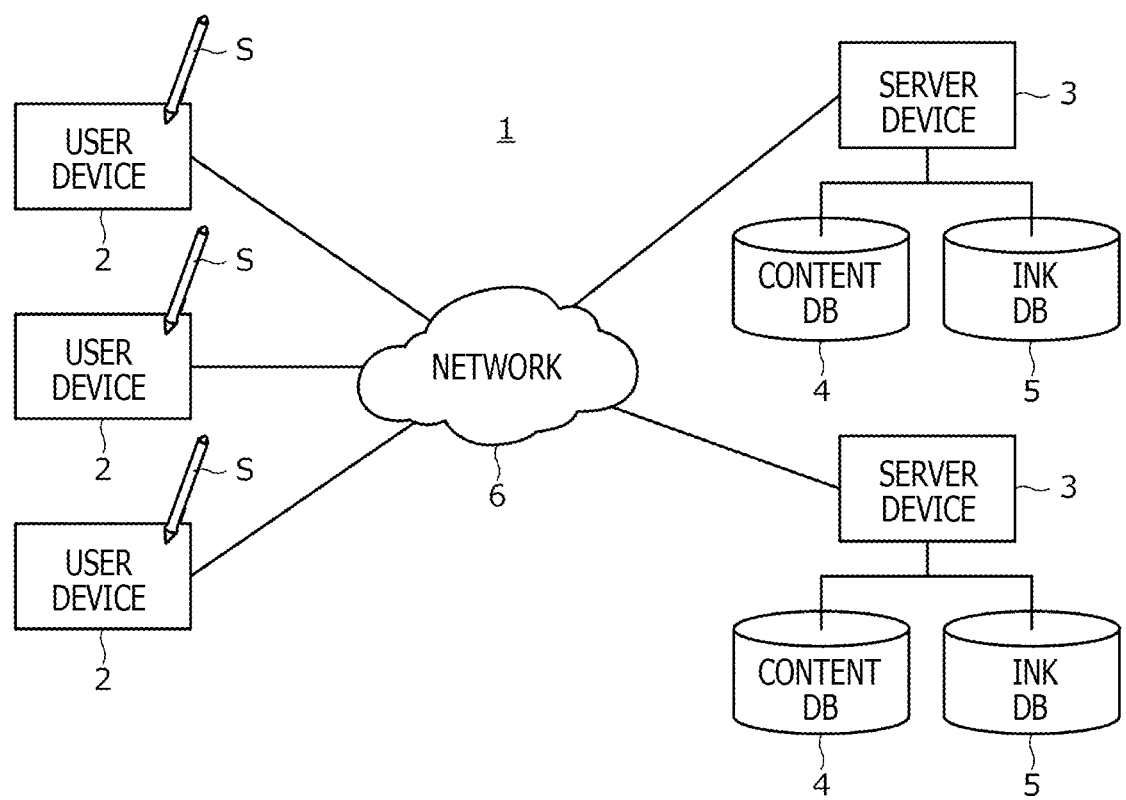
FIG. 1 is a diagram illustrating a configuration of an ink amount calculation system according to an embodiment of the present disclosure.

FIG. 1 is a diagram illustrating a configuration of an ink amount calculation system 1 according to an embodiment of the present disclosure. As illustrated in FIG. 1, the ink amount calculation system 1 according to the present embodiment includes a plurality of user devices 2, a plurality of server devices 3, a plurality of content databases 4, a plurality of ink databases 5, and a network 6. Hereinafter, the plurality of user devices 2, the plurality of server devices 3, the plurality of content databases 4, and the plurality of ink databases 5 may be collectively referred to as the "user device 2," the "server device 3," the "content database 4," and the "ink database 5," respectively.

The user device 2 is, for example, an information processing device such as a personally used computer such as a tablet computer, a smartphone, or a personal computer and can receive an input from an electronic pen S. The server device 3 is an information processing device such as a computer used by a business operator that provides a service based on the "ink amount," and includes one or more server computers or personal computers. The "ink amount" indicates the amount of input made by the electronic pen S.

The network 6 is typically the Internet and serves to mediate communication between computers. The plurality of user devices 2 and server devices 3 illustrated in FIG. 1 can communicate with each other via the network 6.

The content database 4 and the ink database 5 are each a relational database provided together with each server device 3, and its entity is built in a corresponding storage device 31 (see FIG. 3) to be described later. The content database 4 serves to store data of content that can be described using the electronic pen S. Examples of such content include data of workbooks with answer columns. The ink database 5 serves to store ink data indicating the result of an input with the electronic pen S on the user device 2.

Figure 2:
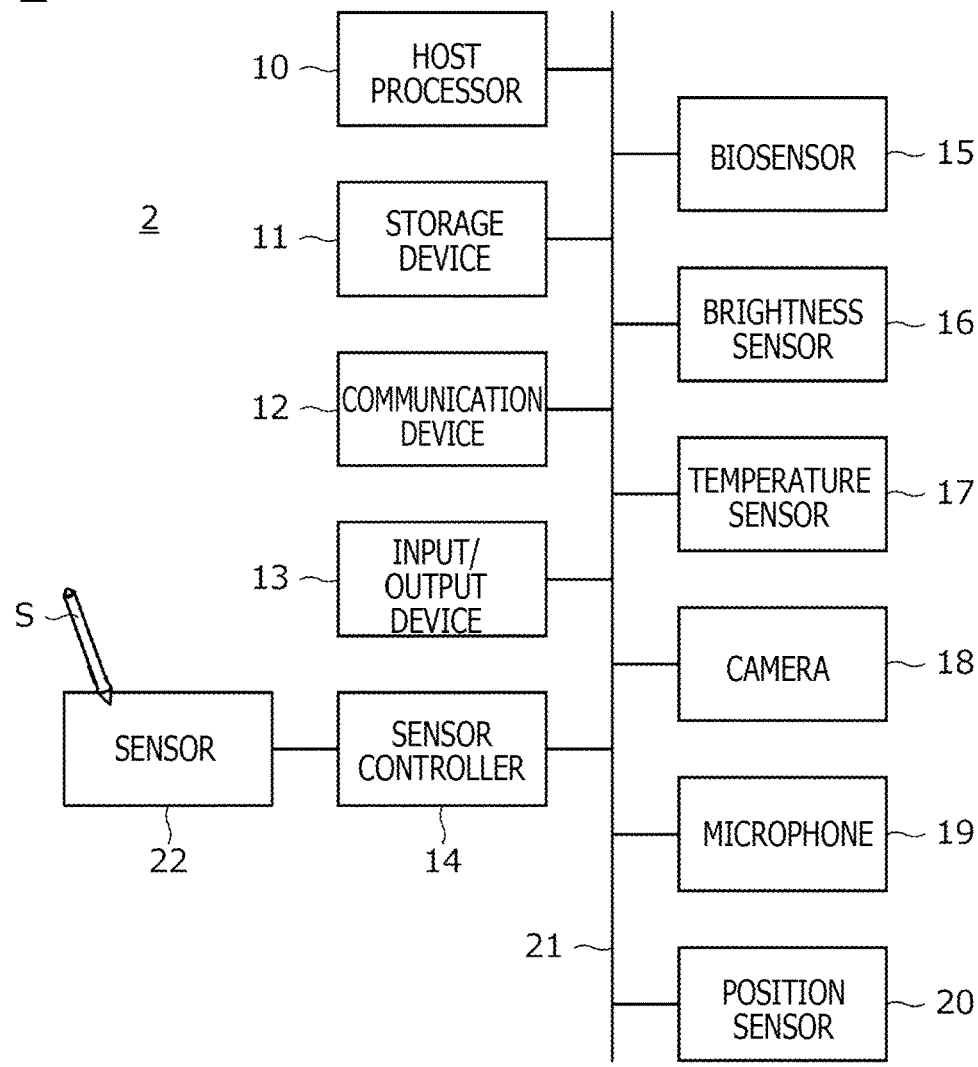
FIG. 2 is a diagram illustrating a configuration of a user device illustrated in FIG. 1.

FIG. 2 is a diagram illustrating a configuration of the user device 2 illustrated in FIG. 1. As illustrated in FIG. 2, the user device 2 has a configuration in which a host processor 10, a storage device 11, a communication device 12, an input/output device 13, a sensor controller 14, a biosensor 15, a brightness sensor 16, a temperature sensor 17, a camera 18, a microphone 19, and a position sensor 20 are connected to each other via a bus 21. The user device 2 also includes a sensor 22 for receiving an input from the electronic pen S. The sensor 22 is connected to the sensor controller 14.

The host processor 10 is a processor that controls each unit of the user device 2 and that reads and executes various programs stored in the storage device 11. The storage device 11 includes a main storage device such as a dynamic random access memory (DRAM) and an auxiliary storage device such as a hard disk. The host processor 10 serves to temporarily and permanently store an operating system of the user device 2, various programs for executing various applications, and data used by these programs.

The applications stored in the storage device 11 and executed by the host processor 10 include a drawing application. The drawing application is an application that performs processes of displaying content supplied from the server device 3, receiving, via the sensor controller 14, an input with the electronic pen S with respect to the content, and drawing characters and figures according to the received contents. Specifically, the process of drawing characters and figures includes a process of generating ink data indicating the result of an input with the electronic pen S, a process of storing the generated ink data in the storage device 11, a process of rendering the stored ink data and displaying the ink data on a display, and a process of supplying the stored ink data to the server device 3. Details of the ink data are described later.

When using the drawing application, a user logs in to the drawing application by entering a pre-assigned user identification (ID) and password. When the drawing application supplies ink data to the server device 3, the drawing application also supplies, to the server device 3, the user ID input at the time of logging in. Although details are described later with reference to FIG. 3, the server device 3 manages the ink data received from the user device 2, in association with the user ID transmitted in this way.

The storage device 11 serves to store the ink amount in association with the pen ID (described later) of the electronic pen S for an input restriction process to be described later. The ink amount indicates the amount of an operation of the electronic pen S performed for inputting ink data. The host processor 10 or the sensor controller 14 continuously calculates the ink amount while the electronic pen S is being used for an input, and adds the ink amount to the ink amount stored in the storage device 11 in association with the pen ID of the electronic pen S. Then, when the ink amount stored in the storage device 11 reaches a predetermined value, the host processor 10 or the sensor controller 14 restricts the input with the electronic pen S. The details of this series of processes (input restriction process) are described later with reference to FIGS. 11 and 12.

The communication device 12 is a device for communicating with external devices by using a wireless communication method such as a wireless local area network (LAN) or a fifth generation mobile communication system or a wired communication method such as a wired LAN, and transmits and receives data according to instructions by the host processor 10. External devices connected to the communication device 12 include the network 6 and the server devices 3 illustrated in FIG. 1.

The input/output device 13 includes input devices and output devices. The input devices receive a user's input operation and supply the user's input to the host processor 10. The output devices output the processing result of the host processor 10 to the user. The input devices included in the input/output device 13 may include, for example, a keyboard and a mouse. The output devices included in the input/output device 13 may include, for example, a display and a speaker.

The sensor controller 14 and the sensor 22 are devices that receive an input from the electronic pen S and that supply the input to the host processor 10. The sensor 22 includes a plurality of electrodes disposed in a touch surface. The sensor controller 14 includes an integrated circuit having a function of acquiring, by communicating with the electronic pen S via the sensor 22, the position of the electronic pen S within the touch surface and the data transmitted from the electronic pen S. A communication method between the sensor controller 14 and the electronic pen S is not particularly limited to any kind. However, it is preferable to use, for example, an active capacitive method or an electromagnetic induction method. The following description continues, assuming that the active capacitive method is used.

When communication using the active capacitive method is performed, the sensor controller 14 transmits an uplink signal via the sensor 22 at regular intervals. The uplink signal is a signal that notifies the electronic pen S of a timing at which a downlink signal is transmitted and that transmits a command for controlling the operation of the electronic pen S. In response to the reception of the uplink signal, the electronic pen S transmits the downlink signal at the timing corresponding to the reception timing of the uplink signal. The downlink signal is a signal including a position signal for causing the sensor controller 14 to detect the position of the electronic pen S and a data signal for transmitting data requested by the command. In response to the reception of the downlink signal via the sensor 22, the sensor controller 14 derives the position of the electronic pen S on the basis of the reception strength of the position signal at each of the plurality of electrodes that constitute the sensor 22, and acquires the data transmitted from the electronic pen S, by demodulating the data signal. The sensor controller 14 supplies the position and data acquired in this way to the host processor 10 each time the position and data are acquired. The host processor 10 (specifically, the drawing application) generates, records, and renders the ink data on the basis of the position and data supplied in this way.

Here, the electronic pen S includes a first electrode, which is disposed at a pen tip, and a second electrode, which is disposed at a position closer to a distal end of the electronic pen S than a pen tip electrode. The downlink signal described above is transmitted from the first electrode. While a position signal is transmitted from the first electrode, another position signal is transmitted from the second electrode. The position signal transmitted from the second electrode has, for example, a frequency different from that of the position signal transmitted from the first electrode. The sensor controller 14 derives the position of each of the first and second electrodes by differentially detecting the position signals transmitted from the first and second electrodes and supplies both positions to the host processor 10. The host processor 10 uses the position of the first electrode as the position indicated by the electronic pen S, while using the position of the second electrode to derive the tilt of the electronic pen S.

The electronic pen S stores in advance the pen ID, which is identification information of the electronic pen S. When starting communication with the electronic pen S, the sensor controller 14 receives the pen ID from the electronic pen S via the data signal described above and stores the pen ID in the storage device 11, thereby establishing pairing with the electronic pen S. The electronic pen S further includes a pressure sensor, which detects a pressure applied to the pen tip, and a switch, which is operable by the user. The data transmitted from the electronic pen S with use of the data signal described above includes pen pressure information, which indicates the value of the pressure detected by the pressure sensor, and switch information, which indicates the ON/OFF state of the switch.

The biosensor 15 is a sensor that measures biometric information such as the heart rate, body temperature, and posture, and serves to acquire the biometric information of the user using the user device 2. The brightness sensor 16 is a sensor that measures the amount of incident light, and serves to detect the brightness of the environment in which the user device 2 is in use. The temperature sensor 17 is a sensor that measures the temperature, and serves to detect the temperature of the environment in which the user device 2 is in use. The camera 18 is a device that captures an image by using an optical system, and serves to capture a picture or moving image of a person who is in front of the user device 2. The microphone 19 is a device that records sound, and serves to record sound generated in the vicinity of the user device 2. The position sensor 20 is a sensor that measures the position by using, for example, a global positioning system (GPS), and serves to acquire the position of the user device 2. The pieces of data acquired by the biosensor 15, the brightness sensor 16, the temperature sensor 17, the camera 18, the microphone 19, and the position sensor 20 are supplied to the host processor 10 in digital form. It is noted that some or all of the biosensor 15, the brightness sensor 16, the temperature sensor 17, the camera 18, the microphone 19, and the position sensor 20 may be configured as separate devices from the user device 2.

Figure 3:
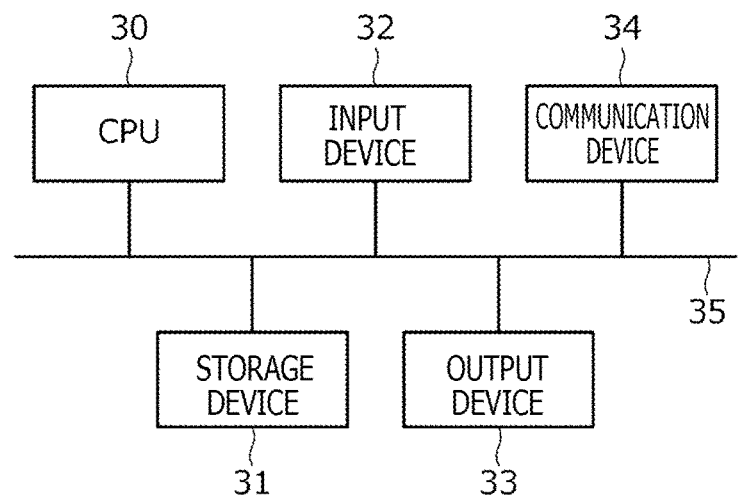
FIG. 3 is a diagram illustrating a configuration of a server device illustrated in FIG. 1.

FIG. 3 is a diagram illustrating a configuration of the server device 3 illustrated in FIG. 1. As illustrated in FIG. 3, the server device 3 has a configuration in which a central processing unit (CPU) 30, the storage device 31, an input device 32, an output device 33, and a communication device 34 are connected to each other via a bus 35.

The CPU 30 is a processor that controls each unit of the server device 3 and that reads and executes various programs stored in the storage device 31. The storage device 31 includes a main storage device such as a DRAM and an auxiliary storage device such as a hard disk and serves to temporarily and permanently store an operating system of the server device 3, various programs for executing various applications, and data used by these programs. The storage device 31 also serves to store the entities of the content database 4 and the ink database 5 illustrated in FIG. 1.

The processing executed by the CPU 30 according to the programs stored in the storage device 31 includes a process of supplying data in the content database 4 to the user device 2 according to a request from the user device 2, a process of storing ink data supplied from the user device 2 in the ink database 5, and a process of analyzing the ink data stored in the ink database 5 and outputting the analysis result. Details of the analysis process are described later with reference to FIGS. 8 to 10.

The input device 32 is a device that accepts a user's input operation and that supplies the user's input to the CPU 30. The input device 32 includes, for example, a keyboard and a mouse. The output device 33 is a device that outputs the processing result of the CPU 30 to the user, and includes, for example, a display and a speaker. The communication device 34 is a device for communicating with external devices by using a wireless communication method such as a wireless LAN or a fifth generation mobile communication system or a wired communication method such as a wired LAN, and transmits and receives data according to instructions by the CPU 30. External devices connected to the communication device 34 include the network 6 and the user devices 2 illustrated in FIG. 1.

FIG. 4 is a diagram illustrating data stored in the ink database 5. The ink database 5 stores ink data supplied from the user device 2, in association with the user ID used at the time of logging in to the drawing application that has generated the ink data. As illustrated in FIG. 4, the ink database 5 can store a plurality of pieces of ink data in association with one user ID.

Figure 5:
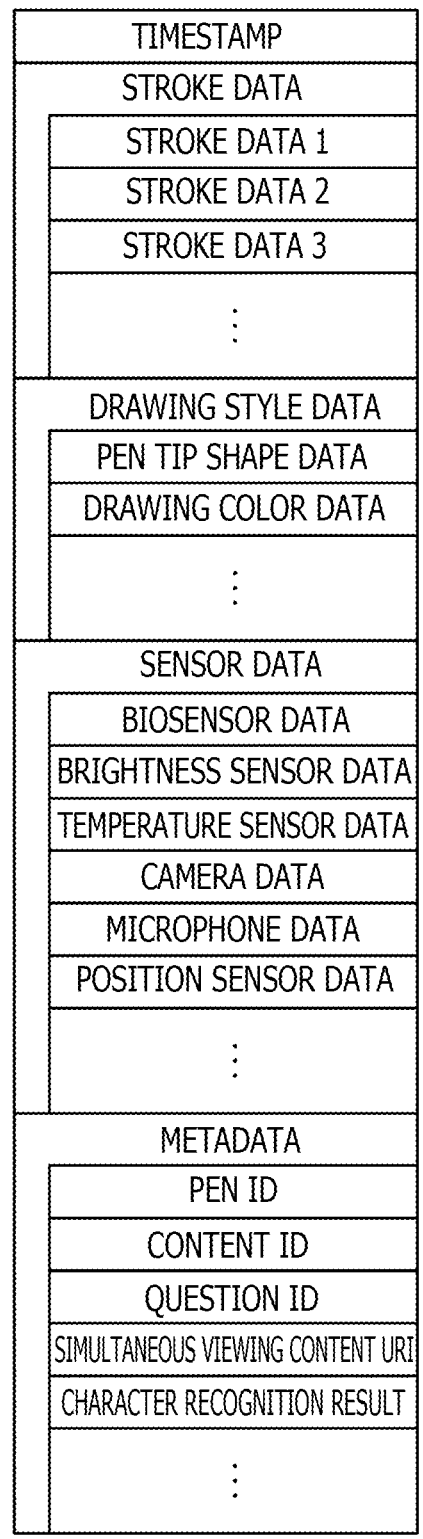
FIG. 5 is a diagram illustrating data structure of ink data illustrated in FIG. 4.

FIG. 5 is a diagram illustrating data structure of the ink data. As illustrated in FIG. 5, the ink data includes a timestamp, stroke data, drawing style data, sensor data, and metadata. The timestamp is time information indicating the time when the ink data was generated, and is provided by, for example, the drawing application. The stroke data is data indicating the trajectory of the electronic pen S from pen-down to pen-up. A plurality of pieces of stroke data may be stored in one ink data.

FIG. 6 is a diagram illustrating data structure of the stroke data. As illustrated in FIG. 6, the stroke data includes a timestamp, scan rate data, and coordinate information, which includes a series of pieces of data each including first coordinates, second coordinates, pen pressure information, and switch information. The timestamp is time information indicating the time when the stroke data was generated, and is provided by, for example, the drawing application. The scan rate data is data indicating the frequency of acquisition of coordinates, and is provided by, for example, the drawing application. The first coordinates are pieces of data indicating the position of the first electrode described above. Therefore, the coordinate information is data related to the trajectory of the electronic pen S. The second coordinates are pieces of data indicating the position of the second electrode described above. The pen pressure information and the switch information are as described above.

Return to FIG. 5. The drawing style data is data that defines the style of a line to be drawn, and is provided by, for example, the drawing application. The drawing style data includes, for example, pen tip shape data and drawing color data as illustrated in FIG. 5. The pen tip shape data is data indicating the shape of the pen tip of the electronic pen S and includes information indicating the type of the pen tip such as a ballpoint pen, a brush, or a color marker and information indicating the thickness of the pen tip. The drawing color data is data indicating the color of the line to be drawn. The drawing application renders the ink data according to this drawing style data.

The sensor data includes data acquired by various sensors (including the camera 18 and the microphone 19) illustrated in FIG. 2. The drawing application acquires data from various sensors and places the data in the ink data when the ink data is generated. The specific contents of the sensor data are described below. Biosensor data is data indicating biometric information acquired by the biosensor 15. Brightness sensor data is data indicating the brightness detected by the brightness sensor 16. Temperature sensor data is data indicating the temperature detected by the temperature sensor 17. Camera data is data indicating a picture or moving image captured by the camera 18. Microphone data is data indicating sound recorded by the microphone 19. Position sensor data is data indicating the position acquired by the position sensor 20.

The metadata is additional data regarding the ink data, and is provided by, for example, the drawing application. The metadata includes, for example, the pen ID, content ID, question ID, simultaneous viewing content uniform resource identifier (URI), and character recognition result, as illustrated in FIG. 5. The pen ID is identification information of the electronic pen S used to input the ink data. The pen ID received by the sensor controller 14 from the electronic pen S is set in the ink data.

The content ID is identification information of content (stored in the content database 4) displayed by the drawing application while the user is performing an input with the electronic pen S. The question ID is information identifying one of the questions when the content indicated by the content ID includes a plurality of questions.

Here, it is preferable that only one pen ID, content ID, and question ID be stored in the ink data each. Therefore, when the pen ID, the content ID, or the question ID is changed due to a change of the electronic pen S in use or a change of the question being answered, it is preferable that the drawing application temporarily stop generating the ink data and start generating new ink data.

The simultaneous viewing content URI is data indicating the address of content (such as a moving image) being reproduced by another certain application in the same user device 2 while the drawing application is generating the ink data. The character recognition result is text data acquired as the result of performing a predetermined character recognition process on the stroke data included in the ink data.

Return to FIG. 1. The user device 2 and the server device 3 each have a function of calculating the above-described ink amount on the basis of the ink data configured as described above. Specifically, the coordinate information described above is extracted from the ink data, and the ink amount is calculated based on the extracted coordinate information. In the server device 3, the calculated ink amount is used for various analyses (such as analysis of how the study environment affects the volume of study and the accuracy rate). In the user device 2, the calculated ink amount is used to restrict an input with the electronic pen S. Hereinafter, examples of an ink amount calculation method are first described with reference to FIGS. 7A and 7B, and then the analysis process performed by the server device 3 is described with reference to FIGS. 8 to 10. Further, the input restriction process performed by the user device 2 is described with reference to FIGS. 11 and 12.

Figure 7A:
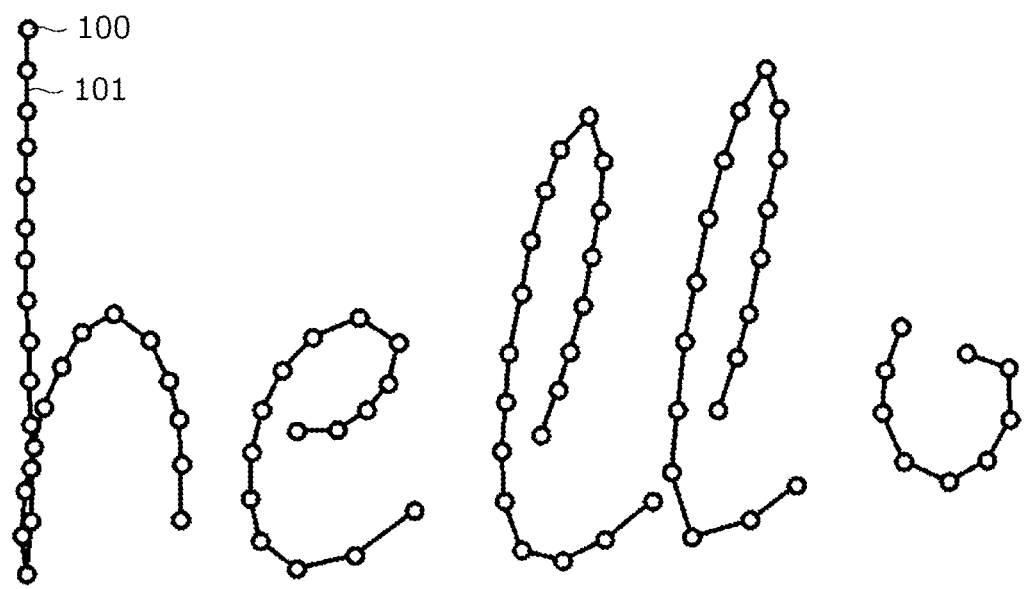
FIGS. 7A and 7B are views for describing examples of an ink amount calculation method.
Figure 7B:
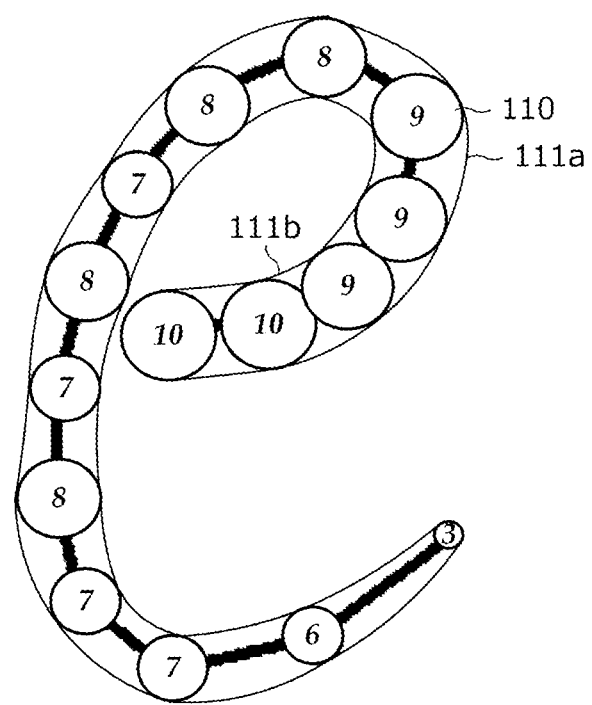

FIGS. 7A and 7B are views for describing examples of the ink amount calculation method. FIGS. 7A and 7B each illustrate an example of the ink amount calculation method performed based on the coordinate information.

FIG. 7A illustrates an example in which the ink amount is calculated based on the number of first coordinates included in the coordinate information. In FIG. 7A, each of a series of coordinates 100 forming the trajectory of a character string "hello" is denoted by a white circle. The drawing application uses predetermined interpolation curves 101 to interpolate these coordinates 100, thereby rendering the ink data. In the example of FIG. 7A, 88 coordinates 100 constitute the stroke data, so that the server device 3 can calculate the ink amount as 88.

Here, the server device 3 may calculate the ink amount further on the basis of the scan rate data described above. That is, even if the number of coordinates 100 forming the trajectory is the same, as the scan rate increases (that is, the frequency of the acquisition of the coordinates increases), the line drawn as the result of rendering shortens. For example, when the scan rate is doubled, the rendered line becomes half as long. Therefore, the server device 3 may be configured such that, as the scan rate indicated by the scan rate data increases, the calculated ink amount decreases. In one example, the ink amount may be calculated by multiplying the number of coordinates 100 by the reciprocal of the scan rate. This allows the ink amount to be proportional to the length of the line drawn as the result of rendering.

FIG. 7B illustrates an example in which the ink amount is calculated based on the area of the stroke data. When drawing a line on the basis of the stroke data, the drawing application draws the line with a line width corresponding to the pen pressure. More specifically, as illustrated in FIG. 7B, the drawing application draws the line by virtually placing a circle 110, which has a radius corresponding to the corresponding pen pressure (the number denoted in the circle 110 in FIG. 7B), at each coordinates and filling the region sandwiched between two envelope lines 111a and 111b, which envelop each circle 110. Therefore, the server device 3 can calculate the area of the stroke data on the basis of the series of coordinates that form the trajectory and the pen pressure information, and can use the area calculated in this way as the ink amount. With this configuration, the thicker the line width, the larger the ink amount. Therefore, the amount of ink consumed by a pen that uses actual ink, such as a ballpoint pen or a color marker, can be reproduced based on the ink amount.

Here, the server device 3 may calculate the area of the stroke data on the basis of the above-described pen tip shape data instead of or together with the pen pressure information. Since the pen tip shape data is data including information indicating the type of the pen tip and information indicating the thickness of the pen tip as described above, the area of the stroke data can also be calculated in this way.

FIG. 8 is a flowchart illustrating a processing flow of the analysis process performed by the server device 3. An overall flow of the analysis process is described with reference to FIG. 8, and specific examples of the analysis process are described with reference to FIGS. 9 and 10 to be described later.

As illustrated in FIG. 8, the server device 3 first extracts, from the ink database 5, one or more pieces of ink data to be analyzed (step S1). Subsequently, the server device 3 extracts various types of data from each piece of ink data according to the purpose of analysis (step S2), and groups these pieces of ink data on the basis of the extracted data (step S3). Then, the server device 3 calculates the ink amount of each piece of ink data by using the method described with reference to FIG. 7A or 7B, and further calculates the total value of ink amounts for each group (step S4). After that, the server device 3 calculates other characteristic values for each group as necessary (step S5), generates an analysis result on the basis of each value calculated so far, and outputs the analysis result to a display or the like (step S6).

Figure 9A:
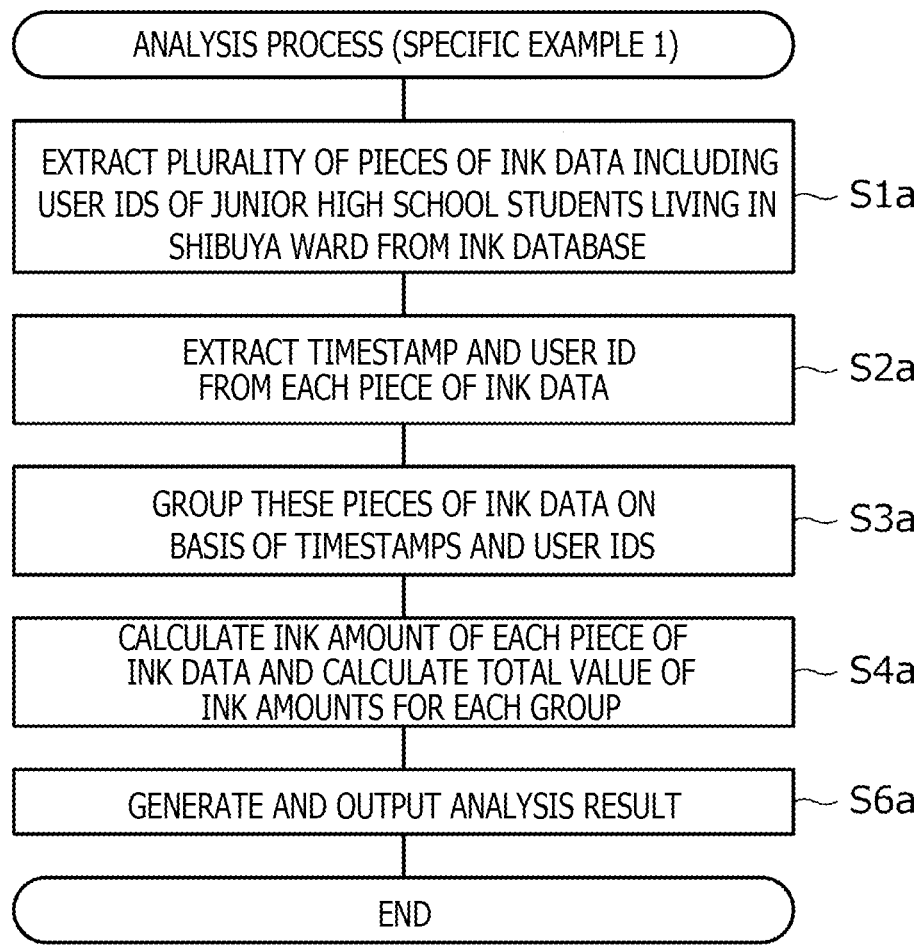
FIGS. 9A and 9B are diagrams illustrating a specific example 1 of the analysis process illustrated in FIG. 8.
Figure 9B:
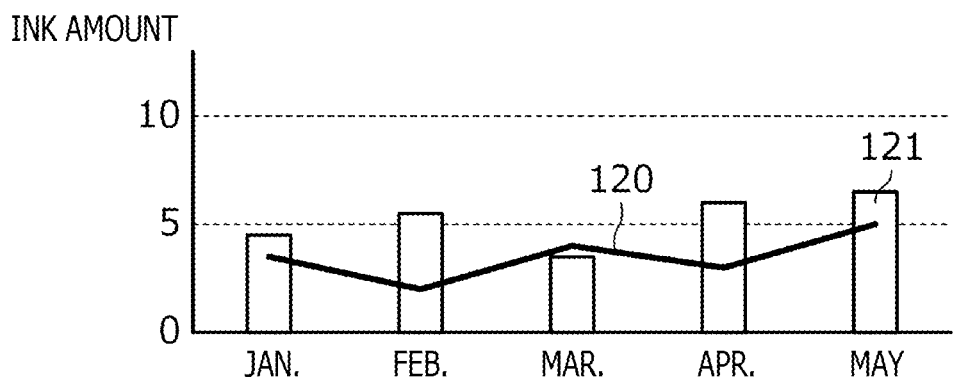

FIGS. 9A and 9B are diagrams illustrating a specific example 1 of the analysis process illustrated in FIG. 8. The specific example 1 is an example in which the ink amount (=the volume of study) associated with a junior high school student living in Shibuya Ward (hereinafter, the user ID of this junior high school student is referred to as a "user ID of interest") is compared, on a monthly basis, to the ink amounts associated with all junior high school students living in Shibuya Ward. FIG. 9A is a flowchart illustrating the processing flow of the analysis process according to this specific example 1. FIG. 9B is a diagram illustrating the analysis result that is output as the result of the process of FIG. 9A.

The server device 3 first extracts a plurality of pieces of ink data including the user IDs of junior high school students living in Shibuya Ward from the ink database 5 (step S1a). Subsequently, the server device 3 extracts the timestamp and the user ID from each piece of extracted ink data (step S2a), and groups these pieces of ink data on the basis of the extracted timestamps and user IDs (step S3a). Specifically, the pieces of ink data associated with the user ID of interest constitute a first large group, while all of the pieces of ink data extracted in step S1a constitute a second large group. Then, based on the timestamps, the plurality of pieces of ink data in each large group are subdivided into small groups by month.

Next, the server device 3 calculates the ink amount of each piece of ink data by using the method described with reference to FIG. 7A or 7B and further calculates the total value of ink amounts for each group (step S4a). Then, the server device 3 generates the analysis result on the basis of the values calculated up to this point and outputs the analysis result without performing step S5 illustrated in FIG. 8 (step S6a).

A line graph 120 illustrated in FIG. 9B denotes a monthly total value of the ink amounts associated with the first large group (that is, the group including only the ink data associated with the user ID of interest). A bar graph 121 illustrated in FIG. 9B denotes the average value of monthly total values of the ink amounts associated with the second large group (that is, the group including all of the pieces of ink data extracted in step S1a). A user viewing this graph can grasp at a glance whether or not the junior high school student corresponding to the user ID of interest is studying compared to the average junior high school students in the same ward, that is, Shibuya Ward. For example, in March, the ink amount associated with the user ID of interest is larger than the average value. Therefore, it is considered that the student studied well. In the other months, however, the ink amount associated with the user ID of interest is smaller than the average value. Therefore, it is considered that the study was insufficient. In February and April, in particular, the ink amount does not reach even half of the average, suggesting the existence of some special circumstances. If this graph is checked by a homeroom teacher of the junior high school student corresponding to the user ID of interest, the homeroom teacher can recognize the need for support of this junior high school student from this graph and provide appropriate support. Further, if the person checking this graph is the junior high school student himself/herself corresponding to the user ID of interest, the junior high school student can be aware of the lack of his/her study from this graph.

Figure 10A:
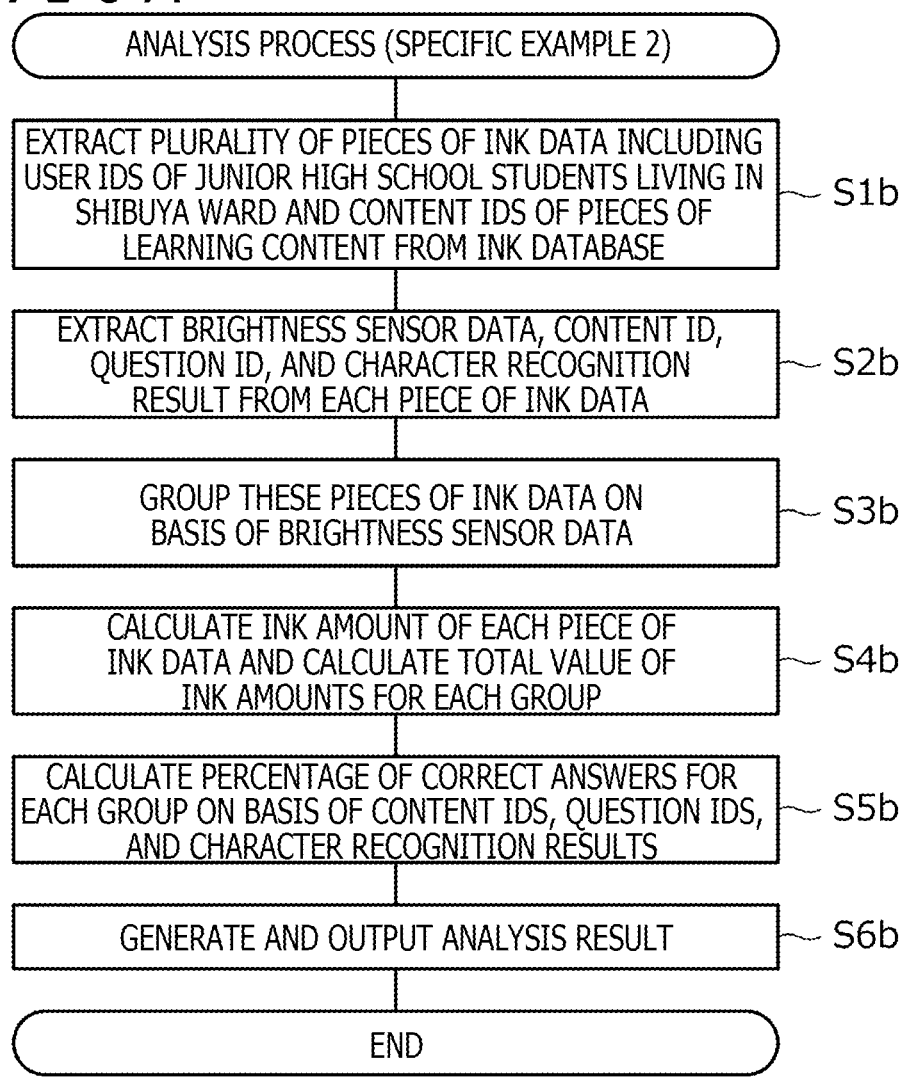
FIGS. 10A and 10B are diagrams illustrating a specific example 2 of the analysis process illustrated in FIG. 8.
Figure 10B:
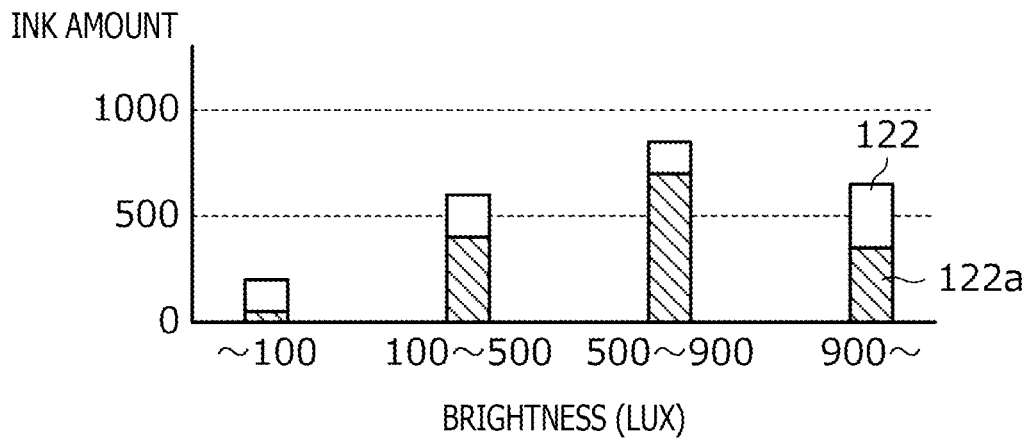

FIGS. 10A and 10B are diagrams illustrating a specific example 2 of the analysis process illustrated in FIG. 8. The specific example 2 is an example that reveals not only under what brightness junior high school students living in Shibuya Ward are studying but also a relation between the brightness and the percentage of correct answers. FIG. 10A is a flowchart illustrating the processing flow of the analysis process according to this specific example 2. FIG. 10B is a diagram illustrating the analysis result that is output as the result of the process of FIG. 10A.

The server device 3 first extracts a plurality of pieces of ink data including both the user IDs of junior high school students living in Shibuya Ward and the content IDs of pieces of learning content from the ink database 5 (step S1b). Subsequently, the server device 3 extracts the brightness sensor data, the content ID, the question ID, and the character recognition result from each piece of extracted ink data (step S2b), and groups these pieces of ink data on the basis of the extracted brightness sensor data (step S3b). FIG. 10B illustrates an example in which those pieces of ink data are grouped into a group of 100 lux or less, a group of 100 to 500 lux, a group of 500 to 900 lux, and a group of 900 lux or more according to the brightness indicated by the brightness sensor data.

Next, the server device 3 calculates the ink amount of each piece of ink data by using the method described with reference to FIG. 7A or 7B, and further calculates the total value of the ink amounts for each group (step S4b). The server device 3 also calculates the percentage of correct answers for each group on the basis of the content IDs, the question IDs, and the character recognition results (step S5b). Specifically, the server device 3 compares the correct answer identified from each content ID and question ID to the corresponding character recognition result to determine whether the answer is correct or wrong for each question ID. The server device 3 calculates the percentage of correct answers for each group as the characteristic value described above, by aggregating the determination result of each piece of ink data. Finally, the server device 3 generates the analysis result on the basis of the values calculated so far and outputs the analysis result (step S6b).

A bar graph 122 illustrated in FIG. 10B denotes the total value of ink amounts for each group. A user viewing this graph can grasp at a glance under what brightness junior high school students living in Shibuya Ward are studying. Further, a shaded portion 122a in the bar graph 122 indicates the number of correct answers. Thus, the user can understand the relation between the brightness and the percentage of correct answers by checking the ratio of the shaded portion 122a to the whole. For example, in the example of FIG. 10B, it can be understood that the number of junior high school students studying under a brightness of 500 to 900 lux is the largest and the percentage of correct answers is also high. On the other hand, it can be understood that there are a certain number of junior high school students studying under darkness of 100 lux or less or excessive lighting of 900 lux or more and the percentage of correct answers of these junior high school students is low. If this graph is being checked by a junior high school teacher, it is possible that the teacher can instruct, based on this graph, junior high school students to study under appropriate lighting, on the ground of the percentage of correct answers.

The analysis process performed by the server device 3 has been described above with specific examples. In the ink amount calculation system 1 according to the present embodiment, however, various analysis processes other than those described above can be performed.

For example, in the example of FIGS. 10A and 10B, the biosensor data (e.g., heart rate) may be used instead of the brightness sensor data. In this case, from the analysis result, it is possible to grasp not only physical conditions during study but also the relation between the physical conditions and the percentage of correct answers. Similarly, in the example of FIGS. 10A and 10B, humidity sensor data may be used instead of the brightness sensor data. In this case, from the analysis result, it is possible to grasp not only humidity during study but also the relation between humidity and the percentage of correct answers.

Further, in the example of FIGS. 10A and 10B, the sound volume level indicated by the microphone data may be used instead of the brightness sensor data. In this case, from the analysis result, it is possible to grasp not only the noise environment in the surroundings during study but also the relation between the noise environment and the percentage of correct answers. In this case, a speech recognition process may be performed to determine whether or not speech indicated by the microphone data is related to a question, and the ink data may be grouped according to the result (how much talk related to the question is conducted). In this way, it is possible to understand the difference in the percentage of correct answers depending on whether or not the question was answered under the guidance of, for example, a parent or tutor.

Further, in the example of FIGS. 10A and 10B, grouping may be performed using the camera data instead of the brightness sensor data. In this case, whether or not a writer is puzzled or whether or not the parent accompanies the writer during study may be determined based on the changes in the facial expression indicated by the camera data, and grouping may be performed according to this result.

Additionally, various analyses related to study can be performed by using the analysis results acquired by the ink amount calculation system 1 according to the present embodiment. Examples of such analyses include the analysis of strengths and weaknesses, analysis of efficient solving methods, analysis of the correlation between repeated practice and its result, analysis of the ink amount consumed until a correct answer was derived, and analysis of the degree of contribution of each student to a group work. In addition to the analyses related to study, it is possible to realize various other analyses and services. For example, possible analyses and services when a picture is drawn by multiple creators in cooperation include analysis of the degree of contribution of each creator, analysis by filtering which portion and how much each creator drew, granting of benefits to those who drew hard (e.g., allowing such creators to use special pen tip shape data), a commission system based on the ink amount, and evaluation of work efficiency (e.g., whether or not the result was produced with a small amount).

Figure 12:
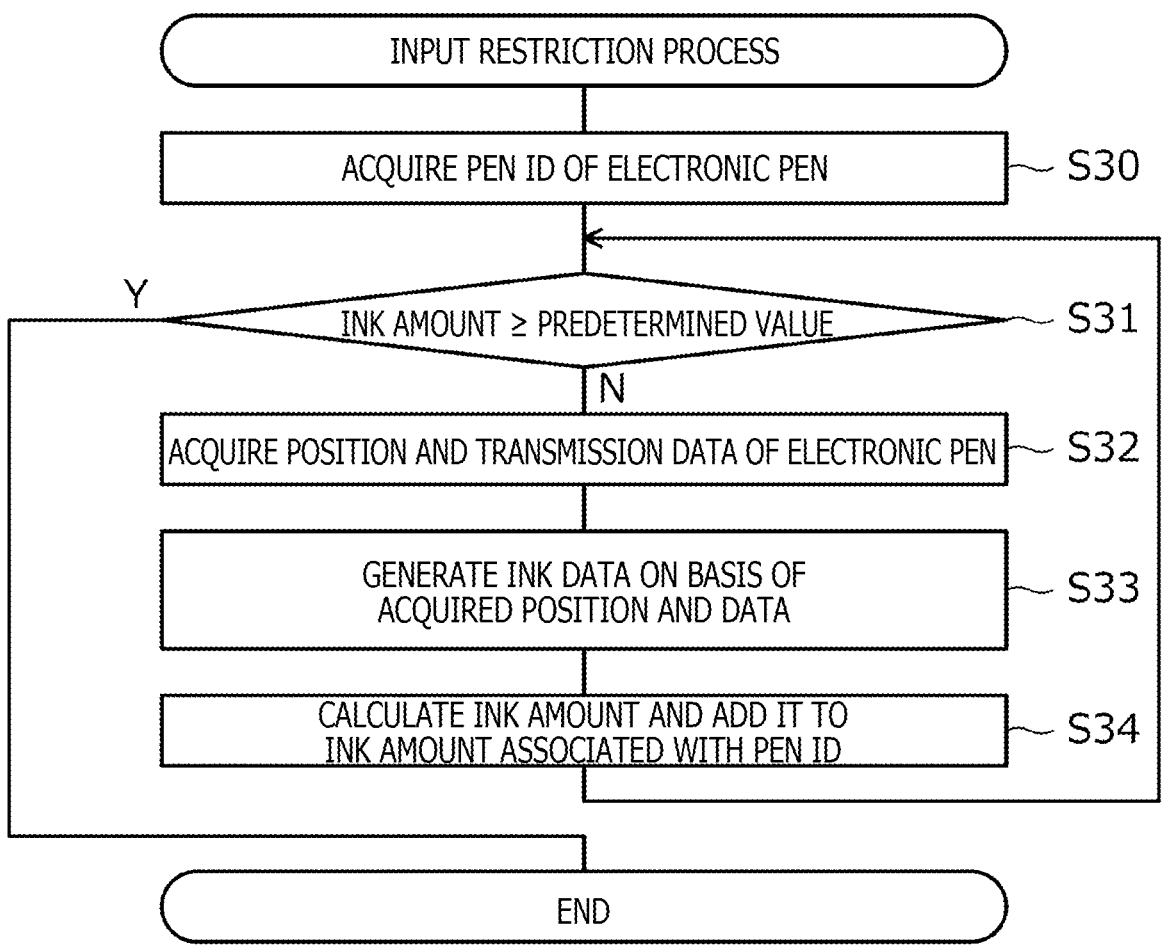
FIG. 12 is a flowchart illustrating another example of the processing flow of the input restriction process performed by the user device illustrated in FIG. 1.

FIG. 11 is a flowchart illustrating an example of the processing flow of the input restriction process performed by the user device 2. FIG. 12 is a flowchart illustrating another example of the processing flow of the input restriction process performed by the user device 2. Specifically, FIG. 11 illustrates an example in which input restriction of the electronic pen S is imposed by the sensor controller 14 illustrated in FIG. 2. FIG. 12 illustrates an example in which input restriction of the electronic pen S is imposed by the drawing application operating in the host processor 10. Each of these examples is described below.

Focusing first on FIG. 11, the sensor controller 14 first performs communication with the electronic pen S (step S10). This communication includes transmission of the uplink signal from the sensor controller 14 and reception of the downlink signal transmitted from the electronic pen S that has received this uplink signal. The sensor controller 14 determines whether or not the downlink signal has been received (step S11). When the sensor controller 14 determines that the downlink signal has not been received, the sensor controller 14 releases pairing if pairing has been established (step S12) and returns to step S10.

On the other hand, when determining in step S11 that the downlink signal has been received, the sensor controller 14 determines whether or not pairing with the electronic pen S has been established (step S13). When determining that pairing has not been established, the sensor controller 14 performs pairing with the electronic pen S (step S14). The processing performed in step S14 includes transmission of the uplink signal directing transmission of the pen ID and reception of the pen ID transmitted from the electronic pen S in response to the uplink signal. The sensor controller 14, which has received the pen ID, stores this pen ID in the storage device 11 and outputs the pen ID to the host processor 10 (step S15).

When determining in step S13 that pairing has been established or when step S15 is completed, the sensor controller 14 acquires the ink amount stored in the storage device 11 in association with the pen ID stored in the storage device 11 and determines whether or not the acquired ink amount is equal to or greater than a predetermined value (step S16). Then, when determining that the ink amount is equal to or greater than the predetermined value, the sensor controller 14 releases the pairing (step S21) and ends the processing. In this case, the user can no longer use the electronic pen S.

When determining in step S16 that the ink amount is not equal to or greater than the predetermined value, the sensor controller 14 derives the position of the electronic pen S on the basis of the position signal transmitted from the electronic pen S and also acquires transmission data of the electronic pen S on the basis of the data signal transmitted from the electronic pen S (step S17). Subsequently, the sensor controller 14 determines whether or not the electronic pen S is in a pen-down state (a state in which the pen tip is in contact with the touch surface), by referring to the pen pressure information included in the transmission data of the electronic pen S (step S18). When the electronic pen S is in the pen-down state, the sensor controller 14 calculates the ink amount and adds this ink amount to the ink amount stored in the storage device 11 in association with the pen ID stored in step S15 (step S19). The calculation of the ink amount in this case is preferably performed based on the number of coordinates, as described with reference to FIG. 7A, for example.

When determining in step S18 that the electronic pen S is not in the pen-down state or when step S19 is completed, the sensor controller 14 outputs the acquired position and data to the host processor 10 (step S20) and returns to step S10. The host processor 10 generates ink data on the basis of the position and data supplied from the sensor controller 14, when the electronic pen S is in the pen-down state. On the other hand, when the electronic pen S is not in the pen-down state, the sensor controller 14 uses the position supplied from the sensor controller 14, to move the cursor being displayed on the display.

Next, focusing on FIG. 12, the drawing application first acquires the pen ID of the electronic pen S from the sensor controller 14 or the storage device 11 (step S30). Then, the drawing application acquires the ink amount stored in the storage device 11 in association with the acquired pen ID and determines whether or not the acquired ink amount is equal to or greater than a predetermined value (step S31). When the sensor controller 14 determines that the ink amount is equal to or greater than the predetermined value, the drawing application ends the processing without performing an ink data generation process (step S33). In this case, the user can no longer use the electronic pen S.

When determining in step S31 that the ink amount is not equal to or greater than the predetermined value, the drawing application acquires the position and transmission data of the electronic pen S from the sensor controller 14 (step S32) and generates, based on the acquired position and data, the ink data described with reference to FIG. 5 (step S33). The ink data generated in step S33 is usually a portion of the ink data, and the drawing application eventually completes one piece of ink data by repeatedly performing step S33.

The drawing application, which has generated the ink data, calculates the ink amount and adds this ink amount to the ink amount stored in the storage device 11 in association with the pen ID acquired in step S30 (step S34). The calculation of the ink amount in this case is preferably performed based on the area of the stroke data as described with reference to FIG. 7B, for example. After that, the drawing application returns to step S31 to continue the processing.

Two examples of the input restriction process performed by the user device 2 have been described above. As described above, in the ink amount calculation system 1 according to the present embodiment, any of the sensor controller 14 and the host processor 10 can perform the input restriction process for the electronic pen S on the basis of the ink amount.

As described above, in the ink amount calculation system 1 according to the present embodiment, the ink amount indicating the amount of the operation of the electronic pen S performed for inputting ink data is calculated. Therefore, the volume of study or work can be visualized. The user of the electronic pen S can view the visualized volume of study or work and gain motivation for study or work therefrom. In addition, teachers and bosses can view the visualized volume of study or work and give students and subordinates some guidance. In addition, although it has been difficult to measure the amount of description in each page with the evaluation based on "the number of sheets of paper answered," which has been done in study in the past, calculating the ink amount makes it easier to grasp the volume of study that is closer to the actual volume of study.

Further, in the ink amount calculation system 1 according to the present embodiment, the calculated ink amount can be analyzed with various types of metadata, so that more detailed analysis of the volume of study becomes possible. For example, it may be recognized that the volume of study fluctuates depending on the environment. Further, in the ink amount calculation system 1 according to the present embodiment, various analyses can be performed based on the calculated ink amount, and the results can be presented to the user. Further, since the total value of ink amounts is known, it is possible to bill for the cost based on the ink amounts when selling a work created using ink data to other companies. In other words, it becomes possible to determine the price of the work not only on the basis of the contents of the work (evaluation of expression), but also on the basis of the amount of labor put into the work. This is considered to be particularly effective as a form of performance fees in the case of individual-level outsourcing such as CrowdWorks, which has been attracting attention in recent years.

In addition, in the ink amount calculation system 1 according to the present embodiment, an input with the electronic pen S can be restricted according to the ink amount. Therefore, ink can be sold separately from the sales of the electronic pen S itself, or the use of the electronic pen S can be flexibly promoted by, for example, allowing trial use up to a predetermined ink amount. Moreover, it is possible to build a system similar to an analog pen, such as setting a limit on the usable ink amount and prompting the user to purchase ink when the ink runs out or changing the consumption speed of the ink amount according to the strength of the pen pressure.

Although the preferred embodiment of the present disclosure has been described above, the present disclosure is by no means limited to the embodiment. As a matter of course, the present disclosure can be implemented in various modes without departing from the scope of the present disclosure.

For example, the server device 3 may store information regarding electronic money or points owned by the user, in association with the user ID, and give electronic money or points according to the ink amount. Accordingly, it is possible to give the user of the electronic pen S an incentive to increase the ink amount (that is, to study or work hard). If the user is a student, it is preferable that the given electronic money or points can be used at school or in nearby stores.

Further, although the server device 3 performs the ink amount analysis process in the example given in the embodiment described above, the user device 2 may perform the analysis process. In this case, the user device 2 only needs to perform the analysis process on the basis of ink data generated by the user device 2 itself.

Further, although, in the example given in the embodiment described above, an input with the electronic pen S is uniformly restricted when the ink amount reaches a predetermined value, an input may be, for example, restricted for each content, such as permitting the user to answer questions until the ink amount reaches the predetermined value.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An ink amount calculation method performed by a processor of a computer, the ink amount calculation the method comprising:

acquiring coordinate information related to stroke data generated according to an operation of an electronic pen, wherein the coordinate information includes a series of coordinates constituting the stroke data, and acquiring pen pressure information indicating a pressure applied to a pen tip of the electronic pen at each of the coordinates; and calculating, based on an area of the stroke data generated based on a plurality of circles each having a radius corresponding the pressure applied to the pen tip of the electronic pen at one of the coordinates, an ink amount related to an amount of the operation of the electronic pen.

2. The ink amount calculation method according to claim 1, wherein the coordinate information includes a series of coordinates constituting the stroke data, and wherein the ink amount calculation method further includes calculating the ink amount based on a number of the coordinates.

3. The ink amount calculation method according to claim 2, further comprising:

acquiring scan rate data indicating a scan rate of the coordinates; and calculating the ink amount based on the number of the coordinates and the scan rate data.

4. The ink amount calculation method according to claim 1, wherein the coordinate information includes a series of coordinates constituting the stroke data, and wherein the ink amount calculation method further includes: acquiring pen tip shape data indicating a shape of a pen tip of the electronic pen, and calculating the ink amount based on an area of the stroke data calculated based on the series of coordinates and the pen tip shape data.

5. The ink amount calculation method according to claim 1, further comprising:

acquiring one or more pieces of ink data each including information related to the stroke data;

grouping the one or more pieces of ink data into one or more groups based on information included in each of the one or more pieces of ink data;

calculating a total value of one or more ink amounts for each of the one or more groups; and controlling display of the total value of the one or more ink amounts on a display.

6. The ink amount calculation method according to claim 5, wherein the grouping is performed based on a timestamp included in each of the one or more pieces of ink data.

7. The ink amount calculation method according to claim 5, wherein the grouping is performed based on sensor data that is data included in each of the one or more pieces of ink data and that is detected by a sensor.

8. The ink amount calculation method according to claim 1, further comprising:

restricting an input with the electronic pen based on the ink amount.

9. The ink amount calculation method according to claim 1, further comprising:

giving electronic money or a point based on the ink amount.

10. An information processing device, comprising:
a processor; and
a memory storing instructions that, when executed by the processor, cause the processor to:

acquire coordinate information related to stroke data generated according to an operation of an electronic pen, wherein the coordinate information includes a series of coordinates constituting the stroke data;

acquire pen pressure information indicating a pressure applied to a pen tip of the electronic pen at each of the coordinates; and calculate, based on an area of the stroke data generated based on a plurality of circles each having a radius corresponding the pressure applied to the pen tip of the electronic pen at one of the coordinates, an ink amount related to an amount of the operation of the electronic pen.

11. The information processing device according to claim 10, wherein the coordinate information includes a series of coordinates constituting the stroke data, and wherein the instructions, when executed by the processor, cause the processor to calculate the ink amount based on a number of the coordinates.

12. The information processing device according to claim 11, wherein the instructions, when executed by the processor, cause the processor to:

acquire scan rate data indicating a scan rate of the coordinates, and calculate the ink amount based on the number of the coordinates and the scan rate data.

13. The information processing device according to claim 10, wherein the coordinate information includes a series of coordinates constituting the stroke data, and wherein the instructions, when executed by the processor, cause the processor to:

acquire pen pressure information indicating a pressure applied to a pen tip of the electronic pen, and calculate the ink amount based on an area of the stroke data generated based on the series of coordinates and the pen pressure information.

14. The information processing device according to claim 10, wherein the coordinate information includes a series of coordinates constituting the stroke data, and wherein the instructions, when executed by the processor, cause the processor to:

acquire pen tip shape data indicating a shape of a pen tip of the electronic pen, and calculate the ink amount based on an area of the stroke data calculated based on the series of coordinates and the pen tip shape data.

15. The information processing device according to claim 10, wherein the instructions, when executed by the processor, cause the processor to:

acquire one or more pieces of ink data each including information related to the stroke data, group the one or more pieces of ink data into one or more groups based on information included in each of the one or more pieces of ink data, calculate a total value of one or more ink amounts for each of the one or more groups, and control display of the total value of the one or more ink amounts on a display.

16. The information processing device according to claim 15, wherein the one or more pieces of ink data are grouped into the one or more groups based on a timestamp included in each of the one or more pieces of ink data.

17. The information processing device according to claim 15, wherein the one or more pieces of ink data are grouped into the one or more groups based on sensor data that is data included in each of the one or more pieces of ink data and that is detected by a sensor.

18. The information processing device according to claim 10, wherein the instructions, when executed by the processor, cause the processor to restrict an input with the electronic pen based on the ink amount.

19. The information processing device according to claim 10, wherein the instructions, when executed by the processor, cause the processor to give electronic money or a point based on the ink amount.

20. A non-transitory computer readable storage medium storing instructions that, when executed by a processor, cause the processor to:
- acquire coordinate information related to stroke data generated according to an operation of an electronic pen, wherein the coordinate information includes a series of coordinates constituting the stroke data;
- acquire pen pressure information indicating a pressure applied to a pen tip of the electronic pen at each of the coordinates; and
- calculate, based on an area of the stroke data generated based on a plurality of circles each having a radius corresponding the pressure applied to the pen tip of the electronic pen at one of the coordinates, an ink amount related to an amount of the operation of the electronic pen.

* * * * *